United States Patent
Shi et al.

(10) Patent No.: US 12,532,902 B2
(45) Date of Patent: Jan. 27, 2026

(54) COMPOSITIONS AND METHODS FOR TASTE MODULATION

(71) Applicant: Givaudan SA, Vernier (CH)

(72) Inventors: Feng Shi, Mason, OH (US); Moises Galano, Sao Paolo (BR); Laura H. Lucas, West Chester, OH (US); Yosuke Onuma, Cincinnati, OH (US); Matthew Steven Roach, Cincinnati, OH (US); Ioana Maria Ungureanu, Cincinnati, OH (US); Wei Yuan, Mason, OH (US)

(73) Assignee: GIVAUDAN SA, Vernier (CH)

( * ) Notice: Subject to any disclaimer, the term of this patent is extended or adjusted under 35 U.S.C. 154(b) by 316 days.

(21) Appl. No.: 18/039,689

(22) PCT Filed: Dec. 17, 2021

(86) PCT No.: PCT/EP2021/086555
§ 371 (c)(1),
(2) Date: May 31, 2023

(87) PCT Pub. No.: WO2022/129558
PCT Pub. Date: Jun. 23, 2022

(65) Prior Publication Data
US 2024/0000113 A1    Jan. 4, 2024

Related U.S. Application Data

(60) Provisional application No. 63/127,135, filed on Dec. 17, 2020.

(51) Int. Cl.
A23L 27/00    (2016.01)
A23L 2/60    (2006.01)
A23L 27/10    (2016.01)
A23L 27/30    (2016.01)

(52) U.S. Cl.
CPC ............. *A23L 2/60* (2013.01); *A23L 27/10* (2016.08); *A23L 27/36* (2016.08); *A23L 27/84* (2016.08); *A23L 27/88* (2016.08)

(58) Field of Classification Search
CPC . A23L 2/60; A23L 27/36; A23L 27/88; A23L 27/10
See application file for complete search history.

(56) References Cited

U.S. PATENT DOCUMENTS

2010/0292175 A1    11/2010    Wessjohann et al.

FOREIGN PATENT DOCUMENTS

| EP | 2923584 A1 * | 9/2015 | ............. A23L 27/31 |
|---|---|---|---|
| JP | 2009502153 A | 1/2009 | |
| JP | 2016537317 A | 12/2016 | |
| WO | 2020178030 A1 | 9/2020 | |

OTHER PUBLICATIONS

Patel, et al. "Viscum articulatum Burm. f.: a review on its phytochemistry, pharmacology and traditional uses". Journal of Pharmacy and Pharmacology, 70 (2018), 159-177. (Year: 2018).*
Office Action mailed on Oct. 1, 2024 for corresponding Japanese patent application No. 2023-536894.
International Search Report for Application No. PCT/EP2021/086555, mailed on Apr. 21, 2022.
International Written Opinion for Application No. PCT/EP2021/086555, mailed on Apr. 21, 2022.
Patel Bhishma P, et al. "Viscum articulatum Burm. f.: a review on its phytochemistry, pharmacology and traditional uses", Journal of Pharmacy and Pharmacology, Oct. 16, 2017, pp. 159-177, vol. 70, No. 2.
Salar Francisco J., et al., "Stevia vs. Sucrose: Influence on the Phytochemical Content of a Citrus-Maqui Beverage—A Shelf Life Study", Foods, Feb. 19, 2020, p. 219, vol. 9, No. 2.
Wang Qiushuang, et al, "Volatile components and nutritional qualities of Viscum articulatum Burm.f. parasitic on ancient tea trees", Food Science & Nutrition, Aug. 11, 2019, pp. 3017-3029, vol. 7, No. 9.

* cited by examiner

*Primary Examiner* — Jenna A Watts
(74) *Attorney, Agent, or Firm* — Curatolo Sidoti & Trillis Co., LPA; Floyd Trillis, III; Salvatore A. Sidoti

(57) ABSTRACT

A consumable is provided. The consumable includes (a) at least one sweetener, and (b) a sweetness modifier comprising an extract or fraction from *Viscum articulatum* or at least one flavan or flavanone compound. The at least one sweetener is present is a sweetening amount.

8 Claims, No Drawings

COMPOSITIONS AND METHODS FOR TASTE MODULATION

CROSS REFERENCE TO RELATED APPLICATIONS

This application is a national stage application of International Application No. PCT/EP2021/086555, filed 17 Dec. 2021, which claims priority from U.S. Provisional Patent Application No. 63/127,135, filed 17 Dec. 2020, both of which applications are incorporated herein by reference.

TECHNICAL FIELD

The present disclosure relates to compositions and methods, which use an extract or fraction from *Viscum articulatum* and one or more flavonoid and/or flavan compounds isolated from *Viscum articulatum*, in flavor compositions and consumables, for example to improve sweetness, improve mouthfeel and masking off-notes of consumables.

BACKGROUND

Compounds for modifying the taste of consumable products, that is, products taken orally either for ingestion or spitting out, such as foodstuffs, beverages, confectionery, oral care products and the like are widely used. They do not themselves add flavor to the consumable, but they provide desirable ancillary benefits, such as enhanced mouthfeel and/or sweetness or masking undesirable characteristics of other ingredients, such as the distinctive tastes and textures perceived as unappealing of products containing sugar replacers.

In the case of sugar replacers, the tastes they impart can present different temporal profiles, flavor-profiles or adaptation behaviors compared with the sugars which they replace, in whole or in part. For example, the sweet taste of natural and synthetic high-intensity sweeteners (HIS), is generally slower in onset and longer in duration than the sweet taste produced by sugar (sweet, short-chain, soluble carbohydrates, including glucose, fructose, sucrose, maltose and lactose) or high fructose corn syrups (HFCS) which is known as a replacement for sugar, and this can change the taste balance of an edible composition containing them. This can create unbalanced temporal taste profiles. In addition to the difference in temporal profile, high-intensity sweeteners generally exhibit lower maximal response than sugar; off-tastes including bitter, metallic, cooling, astringent, licorice-like taste and/or sweetness, which diminishes on iterative tasting.

However, all high-intensity sweeteners have undesirable after-taste in the form of off-notes, such as liquorice-like after-taste, and/or lingering sweetness. In the particular case of Reb A, this takes the form of a combination of an undesirable lingering sweetness and a liquorice-like after-taste. This after-taste detracts from the desired sugar-like sweetness and thus effectively masking undesirable tastes or off-tastes in edible compositions is key to consumer acceptance of many edible compositions.

Accordingly, there remains a need to provide taste modifying ingredients, extracts or fractions which are natural and/or suitable for vegans, i.e. "cleaner label", while at the same time improving mouthfeel, masking off-notes, and/or improving sweetness of consumables.

SUMMARY

In one illustrative embodiment, a consumable composition comprises (a) at least one sweetener, and (b) a sweetness modifier comprising an extract or fraction from *Viscum articulatum* or at least one flavan or flavanone compound. The at least one sweetener is present is a sweetening amount.

In another illustrative embodiment, a flavor composition comprises an extract or fraction from *Viscum articulatum* or at least one flavan or flavanone compound isolated from *Viscum articulatum*.

In yet another illustrative embodiment, a method of enhancing the sweetness or mouthfeel of a consumable including a sweetener comprises adding an extract or fraction from *Viscum articulatum* or at least one flavan or flavanone compound to the consumable in an amount effective to enhance the sweetness or mouthfeel of the consumable.

In yet another illustrative embodiment, a flavor composition comprises a compound selected from the group consisting of 7-O-β-D-glucopyranosyl-7,4'-dihydroxy-5,3'-dimethoxyflavan, 7-O-β-D-glucopyranosyl-7,4'-dihydroxy-5,3'-dimethoxyflavanone, homoeriodictyol 7-O-β-D-glucopyranosyl(1→6)-(β-D-apiofuranosyl(1→2))-ß-D-glucopyranoside, naringenin 7-O-β-D-glucopyranosyl(1→6)-(5-O-benzoyl-β-D-apiofuranosyl(1→2))-ß-D-glucopyranoside and combinations thereof.

These and other features, aspects and advantages of specific embodiments will become evident to those skilled in the art from a reading of the present disclosure.

DETAILED DESCRIPTION

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

The present disclosure relates to the surprising finding that an extract or fraction from *Viscum articulatum* (*V. articulatum*) and one or more flavonoid and/or flavan compounds isolated from the *V. articulatum* extract or fraction, exhibit a sweet modifying effect as well as mouthfeel modifying and masking properties. In particular, the present disclosure relates to the surprising finding that an extract or fraction from *V. articulatum* and one or more flavonoid and/or flavan compounds isolated from *V. articulatum* can be used, for example, to improve the temporal profile of reduced sugar or non-caloric sweeteners bringing them closer to a full sugar experience.

*V. articulatum* is a parasitic herbaceous perennial plant of the family Loranthaceae. It is distributed in south China, India, Malaysia, and surrounding southeast Asian countries. The leaves and stems of *V. articulatum* are traditionally used in Chinese medicine for the treatment of diseases such as hemorrhage, pleurisy, gout, heart disease, arthritis, and hypertension. It is also used in Ayurveda medicinal system for treatment of various disorders. In some regions of China, *V. articulatum* is consumed as a tea drink due to its pleasant sensory quality and health benefit.

All or part of the V. articulatum plant can be used in the present methods. In one embodiment, V. articulatum plant material is partially dried prior to extraction. In another embodiment, V. articulatum plant materially is totally dried prior to extraction. In some embodiments, the plant material is optionally milled prior to extraction.

The plant material may be extracted by any suitable extraction process, such as, for example, continuous or batch reflux extraction, supercritical fluid extraction, enzyme-assisted extraction, microorganism-assisted extraction, ultrasound-assisted extraction, microwave-assisted extraction, etc. The methods may be deployed at any scale.

The solvent used for the extraction can be any suitable solvent, such as for example, polar organic solvents (degassed, vacuumed, pressurized or distilled), non-polar organic solvents, water (degassed, vacuumed, pressurized, deionized, distilled, carbon-treated or reverse osmosis) or a mixture thereof. In a particular embodiment, the solvent comprises water and one or more alcohols. In a particular embodiment, the solvent comprises water and an alcohol selected from methanol, ethanol, n-propanol, 2-propanol, 1 butanol, 2-butanol and mixtures thereof.

The amount of alcohol in the solvent can vary from about 10% to about 100%, such as, for example, about 20%, about 30%, about 40%, about 50%, about 60%, about 70%, about 80%, about 90% or any range between. In a particular embodiment, alcohol comprises from about 80% to about 100% of the solvent, with the remainder being water.

In some embodiments, the extraction process takes place at elevated temperatures, such as, for example, from about 50 to about 100° C. In a more particular embodiment, the extraction process takes place at a temperature at about 100° C.

Those skilled in the art will understand that the duration of the extraction will vary based on the amount of solvent and plant material used. In some embodiments, the extraction is carried out for from about 10 minutes to about 24 hours. Water and/or any insoluble material can be removed from the extraction mixture to provide a "crude extract."

Insoluble plant material may be separated from the extracted mixture by, e.g., filtration. Other suitable separation methods include, but are not limited to, gravity filtration, a plate-and-frame filter press, cross flow filters, screen filters, Nutsche filters, belt filters, ceramic filters, membrane filters, microfilters, nanofilters, ultrafilters or centrifugation. Optionally, various filtration aids such as diatomaceous earth, bentonite, zeolite etc., may be used in this process.

The crude extract is then subjected to one or more chromatographic separations to provide a solution of at least one flavanoid or flavan compound described herein. The crude extract is passed over one or more columns, e.g. those packed with polymeric adsorbent resins. Elution of the one or more columns with aqueous methanol provides a solution containing fractions of the plant extract. In one embodiment, 10% ethanol is first applied to the column and the eluent collected. Fractions can be collected based on % methanol used for elution. e.g., 0% methanol, 30% methanol, 50% methanol, 70% methanol and 100% methanol. Typically, the product of the chromatographic step is collected in multiple fractions, which may then be analyzed using any suitable technique, for example, thin layer chromatography or mass spectrometry.

According to the present disclosure, fractions of V. articulatum include flavans. Flavans are benzopyran derivatives that use the 2-phenyl-3,3-dihydro-2H-chromene skeleton. The general structure for a flavan is given below:

General Structural Formulae of Flavans

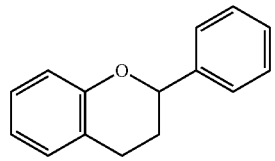

In another embodiment, fractions of V. articulatum include flavonoids. Flavonoids are derived from flavans and have the general structure (C6-C3-C6) given below:

General Structural Formulae of Flavonoids

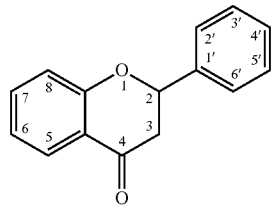

One particular flavonoid of interest according to the present disclosure is flavanones. Flavanones, called dihydroflavones, lack the double bond between carbons 2 and 3 in the C-ring of the flavonoid skeleton.

In one embodiment, flavan and flavanone compounds according to the present disclosure are sweetness modifiers. The term "sweetness modifier", as used herein, refers to a compound that modifies, enhances, amplifies or potentiates the perception of sweetness of a consumable when the compound is present in the consumable in a concentration at or below the compound's sweetener recognition threshold, i.e. a concentration at which the compound does not contribute any noticeable sweet taste in the absence of the additional sweetener(s).

The term "sweetness recognition threshold concentration," as used herein, is the lowest known concentration of a compound that is perceivable by the human sense of taste as sweet.

In another embodiment, flavan and flavanone compounds according to the present disclosure are taste modulators, with or without simultaneously acting as sweetness modifiers. That is, in some embodiments, the flavan and flavanone compounds modify sweetness and modulate one or more taste attributes of a sweetener. In other embodiments, the flavan and flavanone compounds modify the sweetness of a sweetener without modulating one or more taste attributes of the sweetener. In still other embodiments, the flavan and flavanone compounds modulate one or more taste attributes of a sweetener without modifying the sweetness of the sweetener.

In one particular embodiment, the flavan compound according to the following formula (I) is useful as a sweetness modifier and/or taste modifier:

(I)

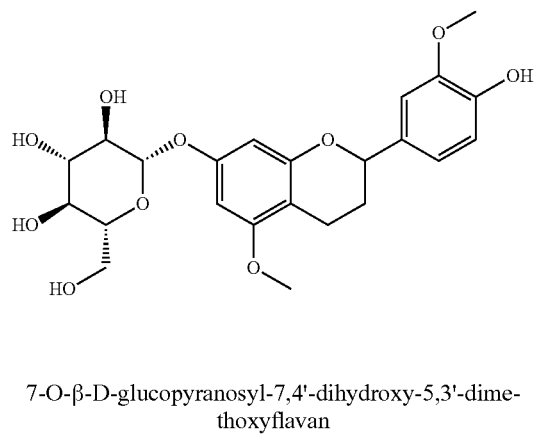

7-O-β-D-glucopyranosyl-7,4'-dihydroxy-5,3'-dimethoxyflavan

In another particular embodiment, flavanone compounds according to the following formulas (IIa, IIb, IIc, IId, and IIe) are useful as sweetness modifiers and/or taste modifiers:

(IIa)

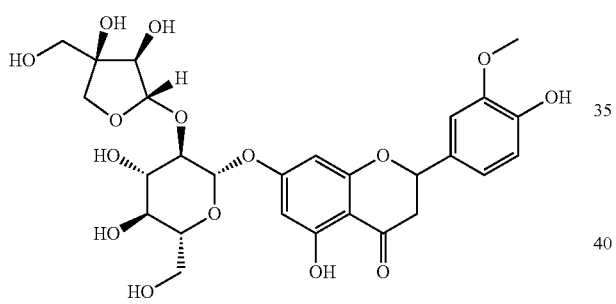

Viscumneoside III (CAS No. 118985-27-6)

(IIb)

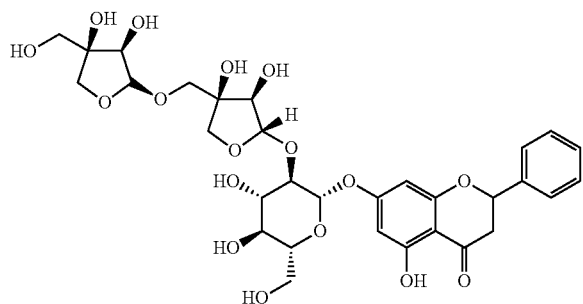

Pinocembrin 7-(apiosyl-(1→5)-apiosyl-(1→2)-β-D-glucopyranoside) (CAS No. 433979-36-3)

(IIc)

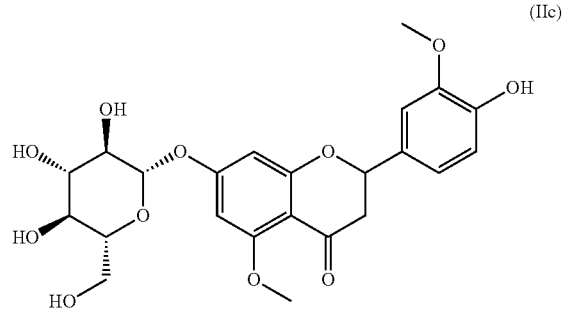 [SMILES: COc1cc(C2CC(=O)c3c(OC)cc(O[C@@H]4O[C@H](CO)[C@@H](O)[C@H](O)[C@H]4O)cc3O2)ccc1O]

7-O-β-D-glucopyranosyl-7,4'-dihydroxy-5,3'-dimethoxyflavanone (IId)

homoeriodictyol 7-O-β-D-glucopyranosyl(1→6)-(β-D-apiofuranosyl(1→2))-ß-D-glucopyranoside (IIe)

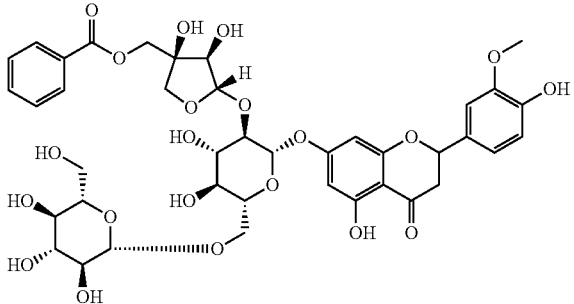

naringenin 7-O-β-D-glucopyranosyl(1→6)-(5-O-benzoyl-β-D-apiofuranosyl(1→2))-ß-D-glucopyranoside Thus, according to one embodiment, the at least one flavanone may be selected from the group consisting of Viscumneoside III, Pinocembrin 7-(apiosyl-(1→5)-apiosyl-(1→2)-β-D-glucopyranoside, 7-O-β-D-glucopyranosyl-7,4'-dihydroxy-5,3'-dimethoxyflavanone, homoeriodictyol 7-O-β-D-glucopyranosyl(1→6) apiofuranosyl(1→2))-ß-D-glucopyranoside, naringenin 7-O-β-D-glucopyranosyl(1→6)-(5-O-benzoyl-β-D-apiofuranosyl(1→2))-ß-D-glucopyranoside and combinations thereof.

Based on the evidence as discussed herein, I, IIc, IId, and IIe were identified as new compounds.

According to the present disclosure, additional known and unknown compounds were identified from fractions of the *V. articulatum* extract via LC-MS and NMR spectral analysis. Those compounds included the following: 1-O-benzyl-[5-O-benzoyl-(β-D-glucopyranosyl(1→2))-β-D-apiofuranosyl(1→2)]-β-D-glucopyranoside; benzyl O-β-D-apiofuranosyl-(1→2)-β-D-glucopyranoside (CAS No. 172428-49-8); (2S)-Eriodictyol-7-O-β-D-glucopyranoside; viscumneoside V (CAS No. 119016-92-1); naringenin 7-O-(2-ß-D-apiofuranosyl)-ß-D-glucopyranoside (CAS No. 952483-10-2); prunin (CAS No. 529-55-5); homoeriodictyol 7-O-ß-D-glucoside (CAS No. 14982-11-7); pinocembrin 7-(apiofuranosyl-(1→2)-β-D-glucopyranoside) (CAS No. 773899-28-8); 2S-viscarticulide A (CAS No. 1885096-55-8); 1-O-benzyl-[5-O-benzoyl-(β-D-glucopyranosyl(1→2))-β-D-apiofuranosyl(1→2)]-β-D-glucopyranoside; 7-O-[2-O-(5-O-feruloyl-β-D-apiofuranosyl)-β-D-glucopyranosyl]-phenylmethanol; naringenin 7-O-β-D-glucopyranosyl(1→6)-(β-D-apiofuranosyl(1→2))-ß-D-glucopyranoside; eriodictyol 7-(apiofuranosyl-(1→2)-β-D-glucopyranoside; homoeriodictyol 7-O-β-D-glucopyranosyl(1→6)-ß-D-glucopyranoside; pinocembrin 7-O-β-D-glucopyranosyl(1→6)-(apiofuranosyl-(1→5)-apiofuranosyl-(1→2))-ß-D-glucopyranoside; and pinocembrin 7-O-β-D-glucopyranosyl(1→6)-(β-D-apiofuranosyl(1→2))-ß-D-glucopyranoside.

The flavan and flavanone compounds described herein can be provided in pure form or as part of a mixture. The mixture can be an extract or fraction prepared from the plant or portion of a plant, as described herein.

The extract or fraction from *V. articulatum* and/or the one or more flavan and/or flavanone compounds described herein modify and/or modulate the taste of at least one sweetener. The at least one sweetener can be any known sweetener, for example, a natural sweetener, a natural high potency sweetener or a synthetic sweetener.

The at least one sweetener is present in a sweetening amount. "Sweetening amount", as used herein, refers to the amount of compound required to provide detectable sweetness when present in a consumable, e.g. a beverage.

As used herein, the phrase "natural high potency sweetener" refers to any sweetener found naturally in nature and characteristically has a sweetness potency greater than sucrose, fructose, or glucose, yet has less calories. The natural high potency sweetener can be provided as a pure compound or, alternatively, as part of an extract. As used herein, the phrase "synthetic sweetener" refers to any composition which is not found naturally in nature and characteristically has a sweetness potency greater than sucrose, fructose, or glucose, yet has less calories.

In other embodiments, the at least one sweetener is a carbohydrate sweetener. Suitable carbohydrate sweeteners are selected from, but not limited to, the group consisting of sucrose, glyceraldehyde, dihydroxyacetone, erythrose, threose, erythrulose, arabinose, lyxose, ribose, xylose, ribulose, xylulose, allose, altrose, galactose, glucose, gulose, idose, mannose, talose, fructose, psicose, sorbose, tagatose, mannoheptulose, sedoheltulose, octolose, fucose, rhamnose, turanose, cellobiose, sialose and combinations thereof. In other embodiments, the at least one sweetener does not comprise a carbohydrate sweetener.

In another embodiment, the additional sweetener is a rare sugar selected from sorbose, lyxose, ribulose, xylose, xylulose, D-allose, L-ribose, D-tagatose, L-glucose, L-fucose, L-arabinose, turanose and combinations thereof. Other sweeteners include siamenoside I, monatin and its salts (monatin SS, RR, RS, SR), curculin, glycyrrhizic acid and its salts, thaumatin, monellin, mabinlin, brazzein, tamatin, hemandulcin, phyllodulcin, glycyphyllin, trilobatin, baiyunoside, osladin, polypodoside A, pterocaryoside pterocaryoside B, imikurozioside, phiomisoside 1, periandrin L abrusoside A, steviolbioside and cyclocarioside 1, sugar alcohols such as erythritol, sucralose, potassium acesulfame, acesulfame acid and salts thereof, aspartame, alitame, saccharin and salts thereof, hesperidin dihydrochalcone glucoside, neohesperidin dihydrochalcone, cyclamate, cyclamic acid and salts thereof, neotame, advantame, glucosylated steviol glycosides (GSGs) and combinations thereof.

In one embodiment, the sweetener is a caloric sweetener or mixture of caloric sweeteners. In another embodiment, the caloric sweetener is selected from sucrose, fructose, glucose, high fructose corn/starch syrup, a beet sugar, a cane sugar and combinations thereof.

In other embodiments, the sweetener comprises at least one steviol glycoside, wherein the at least one steviol glycoside is present in a sweetening amount. The steviol glycoside can be natural, synthetic or a combination of natural and synthetic. The steviol glycoside can be provided in pure form or as part of a mixture, i.e. a steviol glycoside blend. Exemplary steviol glycosides include, but are not limited to, rebaudioside M, rebaudioside D, rebaudioside A, rebaudioside N, rebaudioside O, rebaudioside E, steviolmonoside, steviolbioside, rubusoside, dulcoside B, dulcoside A, rebaudioside B, rebaudioside 1, stevioside, rebaudioside C, rebaudioside F, rebaudioside I, rebaudioside H, rebaudioside L, rebaudioside K, rebaudioside rebaudioside M2, rebaudioside D2, rebaudioside S, rebaudioside T, rebaudioside U, rebaudioside V, rebaudioside W, rebaudioside Z1, rebaudioside Z2, rebaudioside IX, enzymatically glycosylated steviol glycosides and combinations thereof.

The steviol glycoside blend sweetener typically has a total steviol glycoside content of about 95% by weight or greater on a dr, basis. The remaining 5% comprises other non-steviol glycoside compounds, e.g. by-products from extraction or purification processes. In some embodiments, the steviol glycoside blend sweetener has a total steviol glycoside content of about 96% or greater, about 97% or greater, about 98% or greater or about 99% or greater. "Total steviol glycoside content", as used herein, refers to the sum of the relative weight contributions of each steviol glycoside in a sample.

In one embodiment, the sweetener comprises at least one mogroside, wherein the at least one mogroside is present in a sweetening amount. The mogroside can be natural, synthetic or a combination of natural and synthetic. The mogroside can be provided in pure form or as part of mixture, i.e. a mogroside blend. Exemplary mogrosides include, but are not limited to, any of grosmogroside I, mogroside IA, mogroside IE, 11-oxomogroside IA, mogroside II, mogroside II A, mogroside II B, mogroside II E, 7-oxomogroside II E, mogroside III, Mogroside IIIe, 11-oxomogroside IIIE, 11-deoxymogroside III, mogroside IV, Mogroside IVA 11-oxomogroside IV, 11-oxomogroside IV A, mogroside V, isomogroside V, I 1-deoxymogroside V, 7-oxomogroside V, 11-oxomogroside V, isomogroside V, mogroside VI, mogrol, 11-oxomogrol, siamenoside I, and combinations thereof.

In one embodiment, the weight ratio of the at least one sweetener to the at least one flavan or flavanone compound described herein can vary.

Products

According to the present disclosure, the extract or fraction from *V. articulatum* or the flavan and/or flavonone compounds may be added to a sweetened consumable (i.e. a consumable having at least one sweetener therein), or may be provided as part of a flavor composition for consumables.

According to the present disclosure, flavor compositions may include a characterizing flavor and at least one flavan and/or flavonone compound. The term "characterizing flavor" refers to a flavor that is perceived by an individual to be predominant upon consumption by the individual.

In one embodiment, the extract or fraction from *V. articulatum* or the flavan and/or flavonone compounds described herein are present in the flavor composition in an amount such that, when the flavor composition is added to a sweetened consumable, the sucrose equivalence of the consumable is increased compared to the consumable in the absence of the extract or fraction from *V. articulatum* or flavan and/or flavonone compound.

When added to a consumable, the extract or fraction from *V. articulatum* or flavan/flavonone compounds are used in an amount effective to modify the sweetness or mouthfeel of a sweetener without exhibiting any off-taste. According to certain embodiments, the amount of the extract or fraction from *V. articulatum* or at least one flavan/flavonone compound present in the consumable may be in a concentration of from about 0.01 ppm to about 100 ppm. In another embodiment from 0.01 ppm to about 50 ppm, such as, for example, from about 0.01 ppm to about 45 ppm, from about 0.01 ppm to about 40 ppm, from about 0.01 ppm to about 35 ppm, from about 0.01 ppm to about 30 ppm, from about 001 ppm to about 25 ppm, from about 0.01 ppm to about 20 ppm, from about 0.01 ppm to about 15 ppm, from about 0.01 ppm to about 10 ppm and from about 0.01 ppm to about 5 ppm.

In one embodiment, the at least one sweetener described herein is present in the consumable in a concentration from about 50 ppm to about 600 ppm, such as, for example, about ppm to about 500 ppm, from about 50 ppm to about 400 ppm, from about 50 ppm to about 300 ppm, from about 50 ppm to about 200 ppm, from about 50 ppm to about 100 ppm, about 100 ppm to about 600 ppm, about 100 ppm to about 500 ppm, about 100 ppm to about 400 ppm, about 100 ppm to about 300 ppm, about 100 ppm to about 200 ppm, about 200 ppm to about 600 ppm, about 200 ppm to about 500 ppm, about 200 ppm to about 400 ppm, about 200 ppm to about 300 ppm, about 300 ppm to about 600 ppm, about 300 ppm to about 500 ppm, about 300 ppm to about 400 ppm, about 400 ppm to about 600 ppm, about 400 ppm to about 500 ppm and about 500 ppm to about 600 ppm. In another embodiment, for full and reduced sugar applications, the at least one sweetener may be present in the consumable in a concentration up to 100,000 ppm.

When expressed as "ppm", the concentration is parts per million by weight based on the total weight of the consumable. It should be understood that when a range of values is described in the present disclosure, it is intended that any and every value within the range, including the end points, is to be considered as having been disclosed. For example, "a range of from 0.01 ppm to 100 ppm" of the extract or fraction from *V. articulatum* or flavan and/or flavonone is to be read as indicating each and every possible number along the continuum between 0.01 and 100. It is to be understood that the inventors appreciate and understand that any and all values within the range are to be considered to have been specified, and that the inventors have possession of the entire range and all the values within the range.

Flavor compositions may also contain one or more food grade excipient(s). Suitable excipients for flavor compositions are well known in the art and include, for example, without limitation, solvents (including water, alcohol, ethanol, oils, fats, vegetable oil, and miglyol), binders, diluents, disintegranting agents, lubricants, flavoring agents, colouring agents, preservatives, antioxidants, emulsifiers, stabilisers, flavor-enhancers, sweetening agents, anti-caking agents, and the like. Examples of such carriers or diluents for flavors may be found e.g. in "Perfume and Flavour Materials of Natural Origin", S. Arctander, Ed., Elizabeth, N.J., 1960; in "Perfume and Flavor Chemicals", S. Arctander, Ed., Vol. I & II, Allured Publishing Corporation, Carol Stream, USA, 1994; in "Flavourings", E. Ziegler and H. Ziegler (ed.), Wiley-VCH Weinheim, 1998, and "CTFA Cosmetic Ingredient Handbook", J. M. Nikitakis (ed.), 1st ed., The Cosmetic, Toiletry and Fragrance Association, Inc., Washington, 1988.

The flavor composition may have any suitable form, for example liquid or solid, wet or dried, or in encapsulated form bound to or coated onto carriers/particles or as a powder. The flavor composition may include the characterizing flavor in an amount from about 0.01 to about 10%, in another embodiment from about 0.01 to about 5%, in yet another embodiment from about 0.01 to about 1%, or any individual number within the range, by weight of the flavor composition. In another embodiment, a consumable may include the characterizing flavor in an amount from about 0.001 to about 0.5%, in another embodiment from about 0.01 to about 0.3%, in yet another embodiment from about 0.02 to about 0.1%, or any individual number within the range, by weight of the consumable.

In the present disclosure, the term "about" used in connection with a value is inclusive of the stated value and has the meaning dictated by the context. For example, it includes at least the degree of error associated with the measurement of the particular value. One of ordinary skill in the art would understand the term "about" is used herein to mean that an amount of "about" of a recited value produces the desired degree of effectiveness in the compositions and/or methods of the present disclosure. One of ordinary skill in the art would further understand that the metes and bounds of "about" with respect to the value of a percentage, amount or quantity of any component in an embodiment can be determined by varying the value, determining the effectiveness of the compositions or methods for each value, and determining the range of values that produce compositions or methods with the desired degree of effectiveness in accordance with the present disclosure.

The consumable may include a base. As used herein, the term "base" refers to all the ingredients necessary for the consumable, apart from the flavan and/or flavonone compound. These will naturally vary in both nature and proportion, depending on the nature and use of the consumable or additive, but they are all well known to the art and may be used in art-recognized proportions. The formulation of such a base for every conceivable purpose is therefore within the ordinary skill of the art.

Without limitation, and only by way of illustration, suitable bases may include, anti-caking agents, anti-foaming agents, anti-oxidants, binders, colourants, diluents, disintegrants, emulsifiers, encapsulating agents or formulations, enzymes, fats, flavor-enhancers, flavoring agents, gums, polysaccharides, preservatives, proteins, solubilisers, solvents, stabilisers, sugar-derivatives, surfactants, sweetening agents, vitamins, waxes, and the like. Solvents which may be used are known to those skilled in the art and include e.g. water, ethanol, ethylene glycol, propylene glycol, glycerine and triacetin. Encapsulants and gums include maltodextrin, gum arabic, alginates, gelatine, modified starch, other polysaccharides, and proteins.

Examples of excipients, carriers, diluents or solvents for flavor compounds may be found e.g. in "Perfume and Flavour Materials of Natural Origin", S. Arctander, Ed., Elizabeth, N.J., 1960; in "Perfume and Flavour Chemicals", S. Arctander, Ed., Vol. I & II, Allured Publishing Corporation, Carol Stream, USA, 1994; in "Flavourings", E. Ziegler and H. Ziegler (ed.), Wiley-VCH Weinheim, 1998, and "CTFA Cosmetic Ingredient Handbook", J. M. Nikitakis (ed.), 1st ed., The Cosmetic, Toiletry and Fragrance Association, Inc., Washington, 1988.

Non-limiting examples of suitable flavor-providing ingredients include natural flavors, artificial flavors, spices, seasonings, and the like. These include synthetic flavor oils and flavoring aromatics and/or oils, oleoresins, essences, and distillates, and combinations thereof.

Ancillary ingredients may be present to provide other benefits such as enhanced stability, ease of incorporation into a consumable or additive and enhanced nutritional value. Non-limiting typical examples of such ancillary ingredients include stabilizers, emulsifiers, preservatives, gums, starches, dextrins, vitamins and minerals, functional ingredients, salts, antioxidants, and polyunsaturated fatty acids. Particular examples are emulsifiers and carriers, useful in spray drying processes. Non-limiting examples of these are modified starches, such as Capsul™, and maltodextrin.

The additive may be a single ingredient or a blend of ingredients, or it may be encapsulated in any suitable encapsulant. The additive may be prepared by any suitable method, such as spray drying, extrusion and fluidized bed drying.

According to the present disclosure, the term "consumable" refers to products for consumption by a subject, typically via the oral cavity (although consumption may occur via non-oral means such as inhalation), for at least one of the purposes of enjoyment, nourishment, or health and wellness benefits. Consumables may be present in any form including, but not limited to, liquids, solids, semi-solids, tablets, capsules, lozenges, strips, powders, gels, gums, pastes, slurries, solutions, suspensions, syrups, aerosols and sprays. The term also refers to, for example, dietary and nutritional, and health and wellness supplements. Consumables include compositions that are placed within the oral cavity for a period of time before being discarded but not swallowed. It may be placed in the mouth before being consumed, or it may be held in the mouth for a period of time before being discarded.

Broadly, consumables include, but are not limited to, comestibles of all kinds, confectionery products, baked products, sweet products, savoury products, fermented products, dairy products, non-dairy products, beverages, nutraceuticals and pharmaceuticals.

Non-limiting examples of consumables include: wet/liquid soups regardless of concentration or container, including frozen soups. For the purpose of this definition soup(s) means a food prepared from meat, poultry, fish, vegetables, grains, fruit and other ingredients, cooked in a liquid which may include visible pieces of some or all of these ingredients. It may be clear (as a broth) or thick (as a chowder), smooth, pureed or chunky, ready-to-serve, semi-condensed or condensed and may be served hot or cold, as a first course or as the main course of a meal or as a between meal snack (sipped like a beverage), soup may be used as an ingredient for preparing other meal components and may range from broths (consomme) to sauces (cream or cheese-based soups); dehydrated and culinary foods, including cooking aid products such as: powders, granules, pastes, concentrated liquid products, including concentrated bouillon, bouillon and bouillon like products in pressed cubes, tablets or powder or granulated form, which are sold separately as a finished product or as an ingredient within a product, sauces and recipe mixes (regardless of technology); meal solutions products such as: dehydrated and freeze dried soups, including dehydrated soup mixes, dehydrated instant soups, dehydrated ready-to-cook soups, dehydrated or ambient preparations of ready-made dishes, meals and single serve entrees including pasta, potato and rice dishes; meal embellishment products such as: condiments, marinades, salad dressings, salad toppings, dips, breading, batter mixes, shelf stable spreads, barbecue sauces, liquid recipe mixes, concentrates, sauces or sauce mixes, including recipe mixes for salad, sold as a finished product or as an ingredient within a product, whether dehydrated, liquid or frozen; beverages, including beverage mixes and concentrates, including but not limited to, alcoholic and non-alcoholic ready to drink and dry powdered beverages, carbonated and non-carbonated beverages, e.g., sodas, fruit or vegetable juices, alcoholic and non-alcoholic beverages, teas such as green tea and black tea, wine such as red wine; confectionery products, e.g., cakes, cookies, pies, candies, chewing gums, gelatins, ice creams, sorbets, puddings, jams, jellies, salad dressings, and other condiments, cereal, and other breakfast foods, canned fruits and fruit sauces and the like.

Methods of enhancing the sweetness of a consumable and/or modulating one or more taste attributes of the sweetener to make the consumable taste more like a sucrose-sweetened consumable are provided.

In one embodiment, a method of enhancing the sweetness of a consumable comprises (i) providing a consumable comprising at least one sweetener and (ii) adding an extract or fraction from *V. articulatum* or at least one flavan and/or flavonone compound to the consumable to provide a consumable with enhanced sweetness.

In another embodiment, a method of enhancing the sweetness of a consumable comprises (i) providing a consumable base and (ii) adding at least one sweetener and an extract or fraction from *V. articulatum* or at least one flavan and/or flavonone compound to the consumable base to provide a consumable with enhanced sweetness. The at least one sweetener and the extract or fraction from *V. articulatum* or at least one flavan and/or flavonone compound can be added together in the form of a flavor, or separately.

The disclosure is further described with reference to the following non-limiting examples.

EXAMPLES

The following examples are given solely for the purpose of illustration and are not to be construed as limitations of the present invention, as many variations of the invention are possible without departing from the spirit and scope of the present disclosure.

Example 1: Preparation of *V. articulatum* Extract

*V. articulatum* powder (200 g) was loaded onto 66 mL stainless cell (2 or 3 cells depending on the material density). The condition settings of Dionex™ ASE™ 350 Accelerated Solvent Extractor (ASE) are: pressure 1500 psi; temperature 100° C.; static time 15 min; cycle 2; rinse 70%; purge 60 s. Each cell was extracted by 100% and 80% methanol sequentially. All the extracts were combined and the organic solvents were evaporated on rotary evaporator to afford 42 g extracts. The extracts after rotary evaporator were freeze-dried.

Example 2: Isolation and Characterization of Fractions from *V. articulatum*

12 g extracts were suspended in water and loaded onto Diaion HP20 absorbent resin column on Biotage Flash System Isolera One. By eluted with gradient mobile phase (water, 30%, 50%, 70%, 100% methanol), five HP20 fractions were obtained. Part of 50% MeOH HP20 fraction (0.8 g of 1.74 g) was dissolved in methanol and fractionated by preparative HPLC (Column: Waters XSelect CSH Prep C18 5 um 19×250 mm. Mobile phase: 18% acetonitrile in 0.1% formic acid to 50% acetonitrile in 25 min. Flow rate: 16 mL/min). 13 fractions (HP20-50-1~HP20-50-13) were collected by peak detection mode and further separated by semi-preparative HPLC (Agilent 1100 analytical HPLC system. Phenomenex Luna 5μ C8(2) 250×10 mm). The following compounds were isolated from the 13 sub-fractions as shown in the following table.

TABLE I

| Sub-fraction number | Compound | Semi-prep mobile phase | Retention time(min) | Compound weight (mg) |
|---|---|---|---|---|
| HP20-50-1 | benzyl O-β-D-apiofuranosyl-(1→2)-β-D-glucopyranoside | 20% acetonitrile | 12.1 | 7.3 |
| HP20-50-2 | IIc | 22% acetonitrile | 11.9 | 8.6 |
| HP20-50-3 | naringenin 7-O-β-D-glucopyranosyl(1→6)-(β-D-apiofuranosyl(1→2))-β-D-glucopyranoside | 22% acetonitrile | 12.3 | 3.1 |
| HP20-50-4 | IId | 25% acetonitrile | 9.5 | 2.8 |
| HP20-50-5 | eriodictyol 7-(apiofuranosyl-(1→2)-β-D-glucopyranoside | 25% acetonitrile | 10.7 | 0.7 |
| HP20-50-6 | homoeriodictyol 7-O-β-D-glucopyranosyl(1→6)-β-D-glucopyranoside | 30% acetonitrile | 8.0 | 7.3 |
| HP20-50-7 | (2S)-Eriodictyol-7-O-β-D-glucopyranoside | 30% acetonitrile | 8.5 | 0.4 |
| HP20-50-8 | viscumneoside V | 30% acetonitrile | 8.9 | 4.9 |
| HP20-50-9 | pinocembrin 7-O-β-D-glucopyranosyl(1→6)-(apiofuranosyl-(1→5)-apiofuranosyl-(1→2))-β-D-glucopyranoside | 30% acetonitrile | 9.8 | 5.3 |
| HP20-50-10 | naringenin 7-O-(2-β-D-apiofuranosyl)-β-D-glucopyranoside | 35% acetonitrile | 8.1 | 2.8 |
| HP20-50-11 | IIa | 35% acetonitrile | 8.2 | 16.1 |
| HP20-50-12 | prunin | 35% acetonitrile | 11.2 | 4.2 |
| HP20-50-13 | homoeriodictyol 7-O-β-D-glucoside | 35% acetonitrile | 12.3 | 1.7 |

70% MeOH HP20 fraction (1 g of 2.2 g) afforded seven fractions (HP20-70-1~HP20-70-7) after prep-HPLC fractionation. The following compounds were isolated from the 7 sub-fractions as shown in the following table.

TABLE II

| Sub-fraction number | Compound | Semi-prep mobile phase | Retention time(min) | Compound weight(mg) |
|---|---|---|---|---|
| HP20-70-1 | naringenin 7-O-(2-β-D-apiofuranosyl)-β-D-glucopyranoside | 30% acetonitrile | 9.5 | 1.2 |
| HP20-70-1 | IIa | 30% acetonitrile | 10.5 | 3.3 |
| HP20-70-2 | prunin | 30% acetonitrile | 13.1 | 1.5 |
| HP20-70-2 | homoeriodictyol 7-O-β-D-glucoside | 30% acetonitrile | 13.6 | 1.1 |
| HP20-70-2 | pinocembrin 7-O-β-D-glucopyranosyl(1→6)-(β-D-apiofuranosyl(1→2))-β-D-glucopyranoside | 30% acetonitrile | 12.6 | 8.2 |

TABLE II-continued

| Sub-fraction number | Compound | Semi-prep mobile phase | Retention time(min) | Compound weight(mg) |
|---|---|---|---|---|
| HP20-70-3 | IIb | 30% acetonitrile | 15.8 | 11.1 |
| HP20-70-4 | -O-benzyl-[5-O-benzoyl-(β-D-glucopyranosyl(1→2))-β-D-apiofuranosyl(1→2)]-β-D- | NA | | 13.5 |
| HP20-70-5 | IIe | 35% acetonitrile | 10.6 | 5.8 |
| HP20-70-5 | 7-O-[2-O-(5-O-feruloyl-β-D-apiofuranosyl)-β-D-glucopyranosyl]-phenylmethanol | 35% acetonitrile | 11.7 | 10.1 |
| HP20-70-5 | I | 35% acetonitrile | 12.5 | 3.7 |
| HP20-70-5 | pinocembrin 7-(apiofuranosyl-(1→2)-β-D-glucopyranoside | 35% acetonitrile | 13.2 | 10.6 |
| HP20-70-6 | 1-O-benzyl-[5-O-benzoyl-β-D-apiofuranosyl(1→2)]-β-D-glucopyranoside | NA | | 3.3 |
| HP20-70-7 | viscarticulide A | NA | | 12.3 |

TABLE III

High Resolution Electrospray Ionisation Spectrometry

| Compound No. | HRESIMS: m/z [M-H]$^-$ | Calculated formula | Theoretical exact MS |
|---|---|---|---|
| 1-O-benzyl-[5-O-benzoyl-(β-D-glucopyranosyl(1→2))-β-D-apiofuranosyl(1→2)]-β-D-glucopyranoside | 667.2244 | $C_{31}H_{39}O_{16}$ | 667.2238 |
| 7-O-[2-O-(5-O-feruloyl-β-D-apiofuranosyl)-β-D-glucopyranosyl]-phenylmethanol | 577.1925 | $C_{28}H_{33}O_{13}$ | 577.1921 |
| 1-O-benzyl-[5-O-benzoyl-β-D-apiofuranosyl(1→2)]-β-D-glucopyranoside | 505.1716 | $C_{25}H_{29}O_{11}$ | 505.1710 |
| benzyl O-β-D-apiofuranosyl-(1→2)-β-D-glucopyranoside | 401.1444 | $C_{18}H_{25}O_{10}$ | 401.1448 |
| IIc | 477.1398 | $C_{23}H_{25}O_{11}$ | 477.1397 |
| naringenin 7-O-β-D-glucopyranosyl(1→6)-(β-D-apiofuranosyl(1→2))-β-D-glucopyranoside | 727.2083 | $C_{32}H_{39}O_{19}$ | 727.2086 |
| IId | 757.2177 | $C_{33}H_{41}O_{20}$ | 757.2191 |
| eriodictyol 7-(apiofuranosyl-(1→2)-β-D-glucopyranoside | 581.1531 | $C_{26}H_{29}O_{15}$ | 581.1506 |
| homoeriodictyol 7-O-β-D-glucopyranosyl(1→6)-β-D-glucopyranoside | 625.1776 | $C_{28}H_{33}O_{16}$ | 625.1769 |
| pinocembrin 7-O-β-D-glucopyranosyl(1→6)-(apiofuranosyl-(1→5)-apiofuranosyl-(1→2))-β-D-glucopyranoside | 843.2543 | $C_{37}H_{47}O_{22}$ | 843.2559 |
| pinocembrin 7-O-β-D-glucopyranosyl(1→6)-(B-D-apiofuranosyl(1→2))-β-D-glucopyranoside | 711.2133 | $C_{32}H_{39}O_{18}$ | 711.2136 |
| IIe | 861.2463 | $C_{40}H_{45}O_{21}$ | 861.2453 |
| (2S)-Eriodictyol-7-O-β-D-glucopyranoside | 449.1111 | $C_{21}H_{21}O_{11}$ | 449.1084 |
| viscumneoside V | 727.2083 | $C_{32}H_{39}O_{19}$ | 727.2086 |
| naringenin 7-O-(2-β-D-apiofuranosy1)-β-D-glucopyranoside | 565.1559 | $C_{26}H_{29}O_{14}$ | 565.1557 |
| IIa | 595.1658 | $C_{27}H_{31}O_{15}$ | 595.1663 |
| homoeriodictyol 7-O-β-D-glucoside | 433.1135 | $C_{21}H_{21}O_{10}$ | 433.1135 |
| homoeriodictyol 7-O-β-D-glucoside | 463.1242 | $C_{22}H_{23}O_{11}$ | 463.1240 |
| IIb | 681.2000 | $C_{31}H_{37}O_{17}$ | 681.2031 |
| pinocembrin 7-(apiofuranosyl-(1→2)-β-D-glucopyranoside | 549.1607 | $C_{26}H_{29}O_{13}$ | 549.1608 |
| viscarticulide A | 699.1921 | $C_{34}H_{35}O_{16}$ | 699.1925 |
| I | 463.1242 | $C_{23}H_{27}O_{10}$ | 463.1640 |

TABLE IV $^1$H- and $^{13}$C-NMR Spectroscopic Data for Compounds IIc and IId (in DMSO-$d_6$)

| | IIc | | IId | |
|---|---|---|---|---|
| | $\delta_C$ | $\delta_H$ | $\delta_C$ | $\delta_H$ |
| 2 | 78.3 | 5.38 dd (12.8, 2.6) | 78.0 | 5.45 |
| 3 | 44.5 | 3.13 dd (17.0, 12.8), 2.56 dd (17.0, 2.6) | 3.34 2.70 | |
| 4 | 188.2 | | 196.4 | |
| 5 | 162.7 | | 163.1 | |
| 6 | 95.8 | 6.26 s | 95.7 | 6.16 s |
| 7 | 162.9 | | 164.1 | |
| 8 | 93.8 | 6.29 s | 94.5 | 6.12 s |
| 9 | 161.4 | | 162.0 | |
| 10 | 105.9 | | 102.7 | |
| 1' | 129.4 | | 128.5 | |
| 2' | 110.8 | 7.08 d(1.9) | 110.4 | 7.07 d(1.8) |
| 3' | 147.4 | | 146.8 | |
| 4' | 146.7 | | 146.2 | |
| 5' | 114.9 | 6.78 d(8.1) | 114.4 | 6.77 d(8.1) |
| 6' | 119.3 | 6.90 dd (8.1, 1.9) | 119.0 | 6.89 dd (8.1, 1.8) |
| OCH3 | 55.5 | 3.78 s | 54.9 | 3.75 s |
| OCH3 | 55.6 | 3.78 s | | |
| 7-Glc-1 | 99.3 | 4.98 d (7.2) | 96.7 | 5.07 |
| 7-Glc-2 | 72.8 | 3.22 | 75.7 | 3.43 |
| 7-Glc-3 | 76.2 | 3.26 | 75.3 | 3.65 |
| 7-Glc-4 | 69.4 | 3.11 | 68.8 | 3.22 |
| 7-Glc-5 | 76.9 | 3.38 | 75.0 | 3.44 |
| 7-Glc-6 | 60.5 | 3.67, 3.43 | 67.7 | 3.90 d (11.0), 3.58 |
| Api(1→2)-1 | | | 108.0 | 5.28 s |
| Api(1→2)-2 | | | 75.3 | 3.71 |
| Api(1→2)-3 | | | 78.5 | |
| Api(1→2)-4 | | | 73.1 | 3.80 d(9.0), 3.58 d(9.0) |
| Api(1→2)-5 | | | 63.4 | 3.26 |
| Glc(1→6)-1 | | | 102.7 | 4.13 |
| Glc(1→6)-2 | | | 72.7 | 2.95 |
| Glc(1→6)-3 | | | 75.8 | 3.10 |
| Glc(1→6)-4 | | | 69.3 | 3.02 |
| Glc(1→6)-5 | | | 76.1 | 3.03 |
| Glc(1→6)-6 | | | 60.2 | 3.63, 3.41 |

TABLE V $^1$H- and $^{13}$C-NMR Spectroscopic Data for Compounds I and IIe (in Methanol-$d_6$)

| | IIe | | I | |
|---|---|---|---|---|
| | $\delta_C$ | $\delta_H$ | $\delta_C$ | $\delta_H$ |
| 2 | 80.5 | 5.25 dd (12.6, 2.0) (5.12) | 79.1 | 4.85 (overlap) |
| 3 | 44.1 | 3.03 2.64 dd (16.5, 2.0) | 30.6 | 2.13, 1.96 |
| 4 | 198.2 | | 20.4 | 2.70, 2.62 |
| 5 | 165.6 | | 159.6 | |
| 6 | 97.7 | 6.17 s | 93.8 | 6.34 s |
| 7 | 166.3 | | 158.1 | |
| 8 | 96.7 | 6.08 s | 98.3 | 6.26 s |
| 9 | 164.4 | | 158.72 | |
| 10 | 104.8 | | 106.1 | |
| 1 | 131.4 | | 134.6 | |
| 2 | 111.2 | 7.02 d(1.8) | 110.8 | 6.98 s |
| 3' | 149.1 | | 148.6 | |
| 4' | 148.0 | | 147.2 | |
| 5' | 116.1 | 6.82 d(8.2) | 115.9 | 6.78 d(8.1) |
| 6' | 120.6 | 6.87 dd(8.2,1.8) | 119.9 | 6.84 d(8.1) |
| OCH3 | 56.5 | 3.88 s | 56.2 | 3.85 |
| OCH3 | | | 55.8 | 3.79 |
| 7-Glc-1 | 99.3 | 5.08 d (7.1) | 102.5 | 4.84 d(6.9) |
| 7-Glc-2 | 78.4 | 3.63 | 74.8 | 3.37 |
| 7-Glc-3 | 77.1 | 3.71 | 78.0 | 3.43 |
| 7-Glc-4 | 71.3 | 3.40 | 71.3 | 3.37 |
| 7-Glc-5 | 77.4 | 3.69 | 78.2 | 3.41 |
| 7-Glc-6 | 70.0 | 4.12, 3.80 | 62.5 | 3.89, 3.67 |
| Api(1→2)-1 | 110.2 | 5.48 s | | |
| Api(1→2)-2 | 78.6 | 4.00 | | |
| Api(1→2)-3 | 79.1 | | | |
| Api(1→2)-4 | 75.2 | 4.25, 3.89 | | |
| Api(1→2)-5 | 67.9 | 4.33 d(10.3), 4.29 d(10.3) | | |
| Glc(1→6)-1 | 104.6 | 4.32 d(7.9) | | |
| Glc(1→6)-2 | 75.1 | 3.22 | | |
| Glc(1→6)-3 | 77.9 | 3.32 | | |
| Glc(1→6)-4 | 71.5 | 3.27 | | |
| Glc(1→6)-5 | 77.9 | 3.21 | | |
| Glc(1→6)-6 | 62.7 | 3.84, 3.67 | | |
| 1 | 130.7 | | | |
| 2' | 130.5 | 7.88 | | |
| 3' | 129.5 | 7.36 | | |
| 4' | 134.2 | 7.52 | | |
| 5' | 129.5 | 7.36 | | |
| 6' | 130.5 | 7.88 | | |
| 7 | 167.4 | | | |

Example 3: Taste Modulation Using *V. articulatum* Fraction

A water and methanol fraction (50%) of *V. articulatum* was prepared and descriptive sensory evaluations were carried out using different amounts of the extract in different applications. The results of this analysis, as compared to the same applications in the absence of the *V. articulatum* fraction, are presented in Table VI.

TABLE VI

| Application | Fraction (50%) | Taste Evaluation |
|---|---|---|
| Reduced Sugar Lemon Lime Carbonated Soft Drink (21.6% sugar syrup, 0.3% sodium benzoate, 0.4% citric acid, 0.1% lemon lime flavor, 17.87% water, 0.2% sweetness flavor | 4 ppm | Upfront sweet, less metallic, body enhancement, good sweet impact. |

TABLE VI-continued

| Application | Fraction (50%) | Taste Evaluation |
| --- | --- | --- |
| Full Sugar Lemon Lime Carbonated Soft Drink (9.1% sucrose, 0.011% sodium citrate, 0.056 potassium sorbate, 0.3% citric acid, 0.06% lemon lime flavor, water q.s.) | 3 ppm | More 3D, slightly sweeter, a little more round and a little dryer |
| Reduced Sugar Vanilla Milk Beverage (2% sucrose, 0.05% vanilla, 95.95% milk 3.5% fat) | 3 ppm | Longer sweetness |
| Strawberry Yoghurt (4.6% sucrose, 0.05% strawberry, 95.31% Activia Naturel 5.4% sugar) | 3 ppm | More fruity, creamier, sweeter, fuller |
| Base: 0.018% Reb A, 0.45% glucose, 0.45% fructose, 0.9% sucrose, 0.05% citric acid | 10 ppm | Improve upfront and overall sweetness |
| Base: 6% sucrose, 0.1% citric acid, 0.1% sweetness flavor | 8 ppm | Good increase in upfront sweetness, sugary, body, mouthfeel |
| Base: 0.007% Reb A, 0.75% glucose, 0.75% fructose, 1.5% sucrose, 0.05% citric acid | 100 ppm | Sweeter, mouthfeel, upfront, fruity, brown sugar note, increases overall sweetness |

Example 4: Taste Modulation Using Compounds Isolated from *V. articulatum* Extract Descriptive sensory evaluations were carried out using different amounts of compounds isolated from *V. articulatum* fractions in different bases. The results of this analysis, as compared to the same bases in the absence of the compounds, are presented in Table VII.

TABLE VII

| Base | Compound | Taste Evaluation |
|---|---|---|
| 0.018% Reb A, 0.45% glucose, 0.45% fructose, 0.9% sucrose, 0.05% citric acid | 1 ppm of I | Slightly higher sweetness, upfront linger, slightly higher bitterness |
| 6% sucrose, 0.1% citric acid, 0.1% of sweetness flavor | 1 ppm of IIa | Long lasting mouthfeel, more acidic, higher overall sweet |
| 0.018% Reb A, 0.45% glucose, 0.45% fructose, 0.9% sucrose, 0.05% citric acid | 10 ppm of IIb | Higher bitterness, higher astringent, higher linger sweet |
| 0.018% Reb A, 0.45% glucose, 0.45% fructose, 0.9% sucrose, 0.05% citric acid | 1 ppm of IIc | Astringent, sugary, slightly higher sweetness, slightly lower bitterness |
| 0.018% Reb A, 0.45% glucose, 0.45% fructose, 0.9% sucrose, 0.05% citric acid | 2 ppm of IId | Astringent, slightly bitter and sour, slightly linger sweetness, slightly lower bitterness and sourness |
| 0.018% Reb A, 0.45% glucose, 0.45% fructose, 0.9% sucrose, 0.05% citric acid | 1 ppm of IIe | Increase mouthfeel, slightly higher linger, slightly higher bitterness |

Compounds of Table VII demonstrate a positive overall contribution to sweet modulation effects.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A consumable comprising:

(a) at least one sweetener, and (b) an extract or fraction from *Viscum articulatum*, wherein the at least one sweetener is present in a sweetening amount, and wherein the extract or fraction from *Viscum articulatum* is present in a concentration of from 0.01 ppm to 100 ppm.

2. The consumable of claim 1, wherein the at least one sweetener is selected from the group consisting of sucrose, fructose, glucose, xylose, arabinose, rhamnose, tagatose, allulose, trehalose, isomaltulose, steviol glycosides, mogrosides, stevia, trilobatin, rubusoside, aspartame, advantame, agave syrup, acesulfame potassium (AceK), high fructose corn syrup, neotame, saccharin, sucralose, high fructose corn syrup, starch syrup, Luo Han Guo extract, neohespiridin dihydrochalcone, naringin dihydrochalcone, HDG, sugar alcohols cellobiose, psicose, cyclamate, brazzein, thaumatin, molasses, rice syrup and combinations thereof.

3. The consumable of claim 2, wherein the steviol glycosides are selected from the group consisting of rebaudioside M, rebaudioside D, rebaudioside A, rebaudioside N, rebaudioside O, rebaudioside E, steviolmonoside, steviolbioside, rubusoside, dulcoside B, dulcoside A, rebaudioside B, rebaudioside G, stevioside, rebaudioside C, rebaudioside F, rebaudioside I, rebaudioside H, rebaudioside L, rebaudioside K, rebaudioside J, rebaudioside M2, rebaudioside D2, rebaudioside S, rebaudioside T, rebaudioside U, rebaudioside V, rebaudioside W, rebaudioside Z1, rebaudioside Z2, rebaudioside IX, enzymatically glucosylated steviol glycosides and combinations thereof.

4. The consumable of claim 2, wherein the mogrosides are selected from the group consisting of grosmogroside I, mogroside IA, mogroside IE, 11-oxomogroside IA, mogroside II, mogroside II A, mogroside II B, mogroside II E, 7-oxomogroside II E, mogroside III, Mogroside HIE, 11-oxomogroside HIE, 11-deoxymogroside III, mogroside IV, Mogroside IVA 11-oxomogroside IV, 11-oxomogroside IV A, mogroside V, isomogroside V, 11-deoxymogroside V, 7-oxomogroside V, 11-oxomogroside V, isomogroside V, mogroside VI, mogrol, 11-oxomogrol, siamenoside I, and combinations thereof.

5. The consumable of claim 1, wherein the at least one flavan is the extract or fraction from *Viscum articulatum* comprises 7-O-β-D-glucopyranosyl-7,4'-dihydroxy-5,3'-dimethoxyflavan.

6. The consumable of claim 1, wherein the extract or fraction from *Viscum articulatum* comprises Viscumneoside III, Pinocembrin 7-(apiosyl-(1→5)-apiosyl-(1→2)-β-D-glucopyranoside, 7-O-β-D-glucopyranosyl-7,4'-dihydroxy-5,3'-dimethoxyflavanone, homoeriodictyol 7-O-β-D-glucopyranosyl (1→6)-(β-D-apiofuranosyl (1→2))-β-D-glucopyranoside, and naringenin 7-O-β-D-glucopyranosyl (1→6)-(5-O-benzoyl-β-D-apiofuranosyl (1→2))-β-D-glucopyranoside.

7. The consumable of claim 1, wherein the consumable is a beverage.

8. A method of enhancing the sweetness or mouthfeel of a consumable including a sweetener comprising adding an extract or fraction from *Viscum articulatum* to the consumable in a concentration of from 0.01 ppm to 100 ppm.

* * * * *